United States Patent [19]
Davis, Jr. et al.

[11] Patent Number: 5,553,776
[45] Date of Patent: Sep. 10, 1996

[54] METHOD AND CONTROL SYSTEM FOR ECONOMICALLY CONTROLLING AN AUTOMOTIVE HVAC SYSTEM

[75] Inventors: Leighton I. Davis, Jr.; Robert W. Matteson, both of Ann Arbor; Gerhard A. Dage, Franklin, all of Mich.

[73] Assignee: Ford Motor Company, Dearborn, Mich.

[21] Appl. No.: 361,407

[22] Filed: Dec. 22, 1994

Related U.S. Application Data

[63] Continuation-in-part of Ser. No. 83,757, Jun. 30, 1993, Pat. No. 5,427,313, Ser. No. 83,587, Jun. 30, 1993, Ser. No. 83,589, Jun. 30, 1993, and Ser. No. 83,756, Jun. 30, 1993.

[51] Int. Cl.$^6$ ........................................ F24F 7/00
[52] U.S. Cl. ................. 236/49.3; 236/44 C; 62/176.6; 62/228.1
[58] Field of Search ................... 236/49.3, 49.1, 236/49.4, 44 C, 91 C, 91 R; 165/16, 21, 12; 62/176.1, 176.3, 176.6, 176.4, 176.5, 228.4, 228.5, 228.1, 323.4, 211, 223

[56] References Cited

U.S. PATENT DOCUMENTS

| | | | |
|---|---|---|---|
| 3,979,922 | 3/1976 | Shavit | 165/16 X |
| 4,069,030 | 1/1978 | Nickell et al. | 62/176.4 |
| 4,182,180 | 1/1980 | Mott | 236/44 CX |
| 4,340,112 | 7/1982 | Sutoh et al. | 165/16 |
| 4,350,286 | 9/1982 | Sutoh et al. | 236/44 A |
| 4,424,933 | 1/1984 | Sutoh et al. | 236/44 A |
| 4,448,035 | 5/1984 | Moriyama et al. | 62/176.6 |
| 4,482,007 | 11/1984 | Yoshimi et al. | 165/21 |
| 4,487,029 | 12/1984 | Hidaka et al. | 62/133 |
| 4,730,662 | 3/1988 | Kobayashi | 165/25 |
| 4,783,970 | 11/1988 | Takahashi | 62/176.3 |
| 4,848,444 | 7/1989 | Heinle et al. | 165/21 |
| 4,852,363 | 8/1989 | Kampf et al. | 62/176.6 |
| 4,895,000 | 1/1990 | Takahashi | 62/176.3 |
| 4,896,589 | 1/1990 | Takahashi | 98/2.01 |
| 4,910,967 | 3/1990 | Takahashi | 62/176.1 |
| 4,914,924 | 4/1990 | Takahashi | 236/91 CX |
| 4,920,755 | 5/1990 | Tadahiro | 62/171 |
| 5,014,519 | 5/1991 | Noji et al. | 62/176.3 |
| 5,165,595 | 11/1992 | Horio et al. | 236/49.3 |
| 5,167,365 | 12/1992 | Mitoshi et al. | 236/49.3 |

FOREIGN PATENT DOCUMENTS

| | | |
|---|---|---|
| 57-191116 | 11/1982 | Japan . |
| 63-265721 | 11/1988 | Japan . |
| 63-269718 | 11/1988 | Japan . |

*Primary Examiner*—Harry B. Tanner
*Attorney, Agent, or Firm*—Paul K. Godwin, Jr.; Roger L. May

[57] ABSTRACT

Method and control system for economically controlling an automotive HVAC (heating, ventilation and air conditioning) system using fuzzy logic. The control system responds to signals generated by various climate control sensors including a humidity sensor to produce a desired vehicle air temperature and air flow. Fuzzy logic calculations are performed based on fuzzy rules and membership functions to provide nonlinear compensation for setting the rate of clutch cycling in a CCOT system or refrigerant metering in a TXV system.

10 Claims, 4 Drawing Sheets

METHOD AND CONTROL SYSTEM FOR ECONOMICALLY CONTROLLING AN AUTOMOTIVE HVAC SYSTEM

CROSS-REFERENCE TO RELATED APPLICATIONS

This application is a continuation-in-part to U.S. patent application Ser. No. 083,757 entitled "Method And Control System For Controlling An Automotive HVAC System To Prevent The Discharge of Air within A Predetermined Temperature Range" U.S. Pat. No. 5,427,313; U.S. Ser. No. 083,587 entitled "Method And System For Predicting Air Discharge Temperature In A Control System Which Controls An Automotive HVAC System"; U.S. Ser. No. 083,589 entitled "Method And System For Modifying A Linear Control Algorithm Which Controls An Automotive HVAC System"; and U.S. Ser. No. 083,756 entitled "Method And Control System For Controlling An Automotive HVAC System", all of which have the same inventive entity, are assigned to the same assignee and have the same filing date of Jun. 30, 1993.

This application is also related to U.S. patent applications entitled "Method And Control System For Controlling An Automotive HVAC System To Prevent Fogging" U.S. Ser. No. 363,085 and "Method And Control System For Controlling An Automotive HVAC System For Increased Occupant Comfort" U.S. Ser. No. 363,076 both of which have the same inventive entity, are assigned to the same assignee, and have the same filing date of Dec. 23, 1994.

TECHNICAL FIELD

This invention relates to methods and control systems for controlling an automotive HVAC system and, in particular, to methods and systems for controlling an automotive HVAC system economically.

BACKGROUND ART

A fundamental goal of automotive heating, ventilating, and air conditioning (HVAC) systems is to make vehicle occupants comfortable. In doing so, it is important to control such systems with fuel economy in mind.

In an attempt to measure and control the many variables that affect passenger comfort, modern automotive HVAC systems have many sensors and control actuators. A typical system might have a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

It falls to the controller to sort out the range of possible conditions, determine what is needed to economically achieve comfort, and coordinate the control of the set of actuators available. This multiple input, multiple output control problem may not fall into any convenient category of traditional control theory since fogging conditions may also be considered. The response of the system as well as the relationship between system variables and desired performance, fuel economy, is rarely linear. Also, it is important to note that despite all the actuators and variables available for control, there may exist conditions under which good fuel economy may not be achievable.

Due to practical considerations of size, energy consumption, cost and the wide conceivable range of conditions that automobiles are exposed to, the system plant may simply not be able to supply what is needed. All these considerations lead to a control problem that is far from what is usually encountered in traditional control theory.

In the face of these difficulties, most control system designs have used what is familiar—linear control—and supplemented it by patched-in specific responses to handle special circumstances where necessary. In other words, typical automobile automatic climate control systems use linear proportional control to maintain the interior environment. However, there are significant limitations of linear proportional control when viewed from the standpoint of fuel economy. For example, there are certain control situations in any HVAC system that are inherently nonlinear.

The linear approach has obvious limitations when dealing with nonlinear situations. All HVAC systems behave nonlinearly in various regions of their operation. The transfer of heat as a function of blower speed is nonlinear. The onset of any plant output limitation affects desired response in a nonlinear fashion. Factors affecting plant limitations may be tracked via additional sensors—for example, engine coolant temperature (ECT) correlates with heater core temperature—but again, the relationship is nonlinear. The usual approach to handling special nonlinear situations is to use logic-based modification of the usual linear strategy when these situations are detected. Thus, in cold weather, when ECT is below a certain threshold indicating that the heater core cannot warm the cabin, the blower would be shut off.

In addition to the current difficulties, new vehicle lines create additional problems that are not easy to overcome. The reduction in interior and under hood package space in current vehicle designs has caused the transfer function for discharge temperature to be even more nonlinear, especially when operating at the extremes of ambient temperature.

Fuzzy Logic Approach

Fuzzy logic is a methodology for handling knowledge that contains some uncertainty or vagueness. The foundations of fuzzy logic were set forth in the 1960s by L. A. Zadeh in his paper entitled "Fuzzy Sets", INFORM. CONTRO, 8 pp. 338–353, 1965.

In current engineering application, fuzzy logic is most often found in control problems in the form of a particular procedure, called "max-min" fuzzy inference as described by Ebrahim Mamdani in his paper entitled "Application of Fuzzy Logic to Approximate Reasoning Using Linguistic Synthesis", IEEE TRANSACTIONS ON COMPUTERS, (1977) C-26, No. 12, pp. 1182–1191. This procedure incorporates approximate knowledge of appropriate control response for different circumstances into sets of rules for calculating a particular control action. The rules are expressed in terms of "IF (situation holds), THEN (take consequent control action)". The degree to which a particular consequent action is taken depends on the degree to which its corresponding conditions hold. The linguistic expression of a situation or consequent control action is translated into a definite calculation via specified membership functions. A membership function quantifies what is meant by a phrase such as "The temperature is high" by defining the degree of membership in the class, "high", depending on the value of the input variable, temperature.

U.S. Pat. No. 5,014,519 discloses an automotive air tempering apparatus including a variable displacement compressor wherein use of the compressor is varied by changing the angle of a wobble plate.

SUMMARY OF THE INVENTION

An object of the present invention is to provide a non-linear method and control system for controlling an automotive HVAC system to provide greater system economy over existing methods and control systems by being able to handle imprecision naturally as a consequence of its structure and organization.

In carrying out the above object and other objects of the present invention, a method is provided for economically controlling a heating, ventilation and air conditioning (HVAC) system of a vehicle which discharges a flow of air to a passenger cabin of the vehicle. The system includes a variable speed blower, ducting, cooling means for cooling air in the ducting, a control element having control positions for varying refrigerating capacity of the cooling means, actuators having various control positions for controlling the direction of air flow and the ratio of fresh air to recirculated air, a humidity sensor for sensing relative humidity within the cabin, and temperature sensors for sensing temperature within the cabin, ambient temperature and a target set point temperature. The method includes the steps of estimating enthalpy of air within the cabin based on temperature and relative humidity within the cabin, and defining membership functions and fuzzy rules between the enthalpy and the control positions of the control element. The method also includes the step of generating a control signal to control the position of the control element to cause the system to economically discharge air into the cabin having a desired temperature and flow based on the enthalpy, the membership functions and the fuzzy rules.

Further in carrying out the above object and other objects of the present invention, a system is provided for carrying out each of the above method steps.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
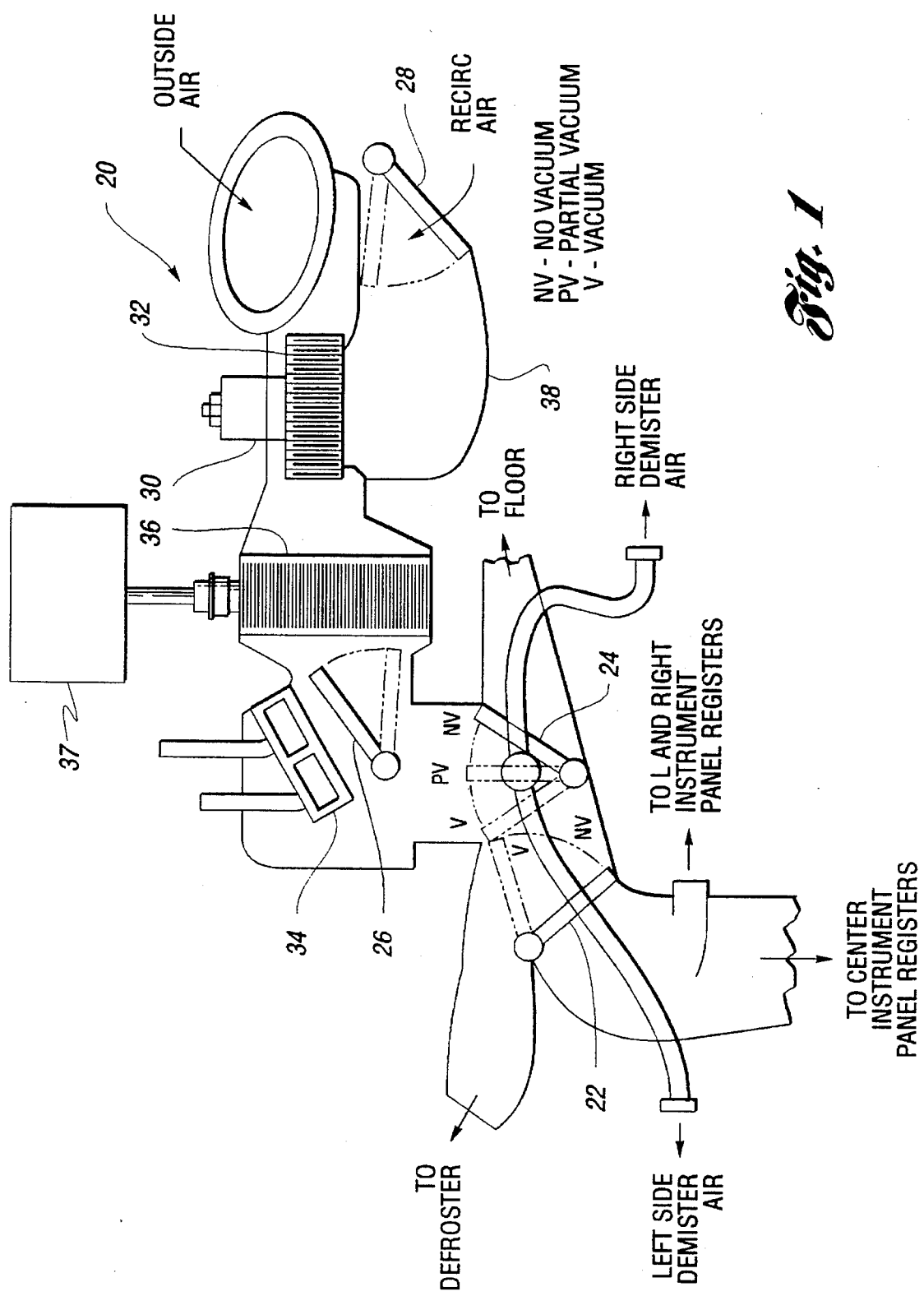
FIG. 1 is a schematic diagram illustrating an air handling system which can be controlled by the method and control system of the present invention.

In general, control of air temperature and air flow (and to a lesser extent, humidity) within an automobile is accomplished using various actuators to affect the temperature and flow of air supplied to the cabin of the vehicle. FIG. 1 shows schematically an air handling system of an HVAC (heating, ventilation and air conditioning) system., generally indicated at 201. The system 20 includes the arrangement of panel-defrost, floor-panel, temperature blend and outside recirc air actuators or doors 22, 24, 26 and 28, respectively. The doors 22 and 24 are preferably driven by vacuum motors (not shown) between their various vacuum, partial vacuum and no vacuum positions in a conventional fashion as indicated in FIG. 1. The door 26 is driven by an electric servo motor also in a conventional fashion. The door 28 may also be driven by an electric servo motor so that the position of the door 28 is continuously variable.

The system 20 also includes a variable speed motor 30 including a blower wheel 32.

The system further includes heating and cooling elements such as a heater core 34 and an evaporator core 36 in a typical vehicle air conditioning plant, generally indicated at 37. The evaporator temperature is normally controlled in a conventional automatic fashion to allow the system to dehumidify air passing thereover. The plant 37 includes a compressor which is selectively coupled to the vehicle's engine by a control element such as an A/C clutch in a CCOT (clutch cycling orifice tube) system. Typically, the plant 37 also includes a condenser, a refrigerant tank, pressure cycling switch, and an expansion orifice or capillary.

Alternatively, the plant 37 is a TXV (thermal expansion valve) system wherein the control element is a valve for metering refrigerant to the evaporator core 36. Each of the above components are connected via ducting 38. In this way, the above components control temperature, the direction of air flow and the ratio of fresh air to recirculated air.

Figure 2:
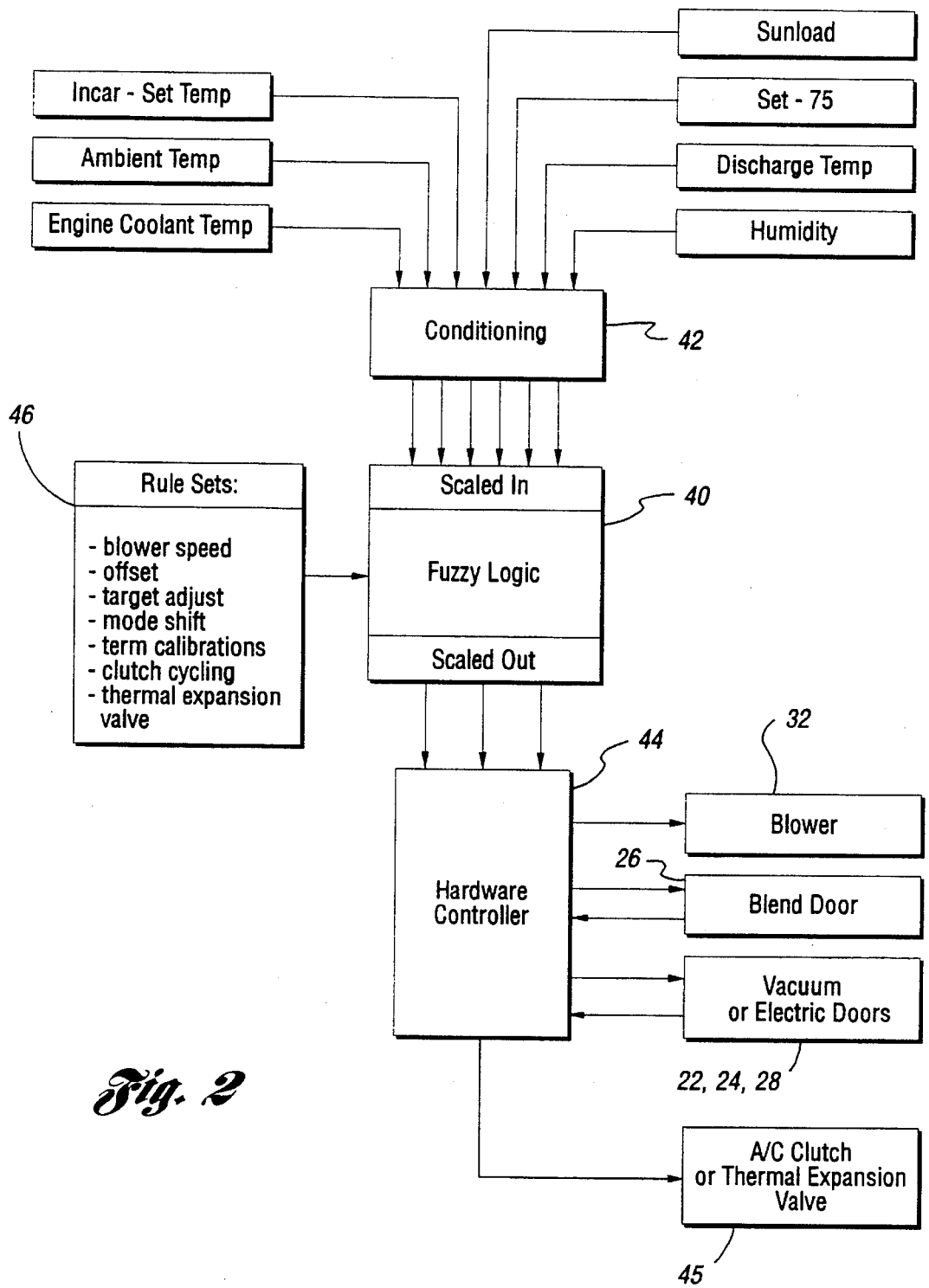
FIG. 2 is a schematic block diagram of the control system of the present invention.

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of in-car temperature, ambient (outside) air temperature, engine coolant temperature (ECT), discharge air temperature, humidity and sunload. In addition, there is a set signal or set temperature value indicating the desired temperature that is set manually by the driver. In turn, an incar-set temperature (in-car minus set temperature) signal and a set-75 (set temperature minus 75 degrees Fahrenheit) signal are generated or calculated.

The signals are provided to an electronic controller 40 as inputs after being conditioned by a conditioning circuit 42. The controller 40 scales the input signals and provides scaled output signals for use by a hardware controller 44 which, in turn, controls the doors 22 through 28, the blower 32 and the control element 45 to regulate the temperature and flow of air and ultimately to allow for more economic operation of the HVAC system.

In the block diagram of the fuzzy logic system of FIG. 2, sensor inputs are conditioned, scaled, and passed to a fuzzy inference engine of the controller 40. Rule sets 46 for the various control functions—blower speed, offset, target set point, mode shift, recirculation/fresh ratio, term calibrations, clutch cycling rate or expansion valve position, etc. provide the inference engine with the details of the strategy to be performed. The fuzzy outputs are scaled and passed to the routines to control the motors, actuators, doors that accomplish the flow and conditioning of the air supplied to the passenger compartment and control element (i.e., A/C clutch or expansion valve). The rule set basis for control organizes the strategy in a manner that allows easy calibration and adjustment of the control operation.

The fuzzy logic climate controller 40 preferably uses a Motorola 68HC11 microprocessor for its calculations. This microprocessor has 512 bytes of RAM and 12 kilobytes of ROM built in. It uses an 8 megahertz clock providing a 500 nanosecond instruction cycle time. An eight channel analog-to-digital converter is integrated into the microprocessor. Five of the eight channels are used to measure inputs that are used by the control system, namely: ambient (outside) temperature, engine coolant temperature, interior temperature, relative humidity and sunload. A further input to the system is the set point temperature which may be adjusted by the vehicle occupants using buttons on the front face of the control unit. The system outputs are: discharge air mode, intake air ratio (fresh air or recirculate), blend door position, and blower speed. The latter three outputs are continuous-valued, the former discrete. The fuzzy logic control calculation takes scaled input values and produces a single relative output value.

The controller 40 is preferably programmed primarily in C and cross-compiled into microprocessor instructions. Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

The method and system of the present invention involves the combination of a humidity sensor and information processing, suitable for use by the electronic automatic temperature controller 40. Humidity information from the sensor, in combination with information already available to the controller 40 (cabin temperature, ambient temperature, blower speed, etc.) allows the calculation of a climate control strategy that takes cabin humidity into account. With humidity information, the strategy may be adjusted to allow for more economic operation.

Figure 4:
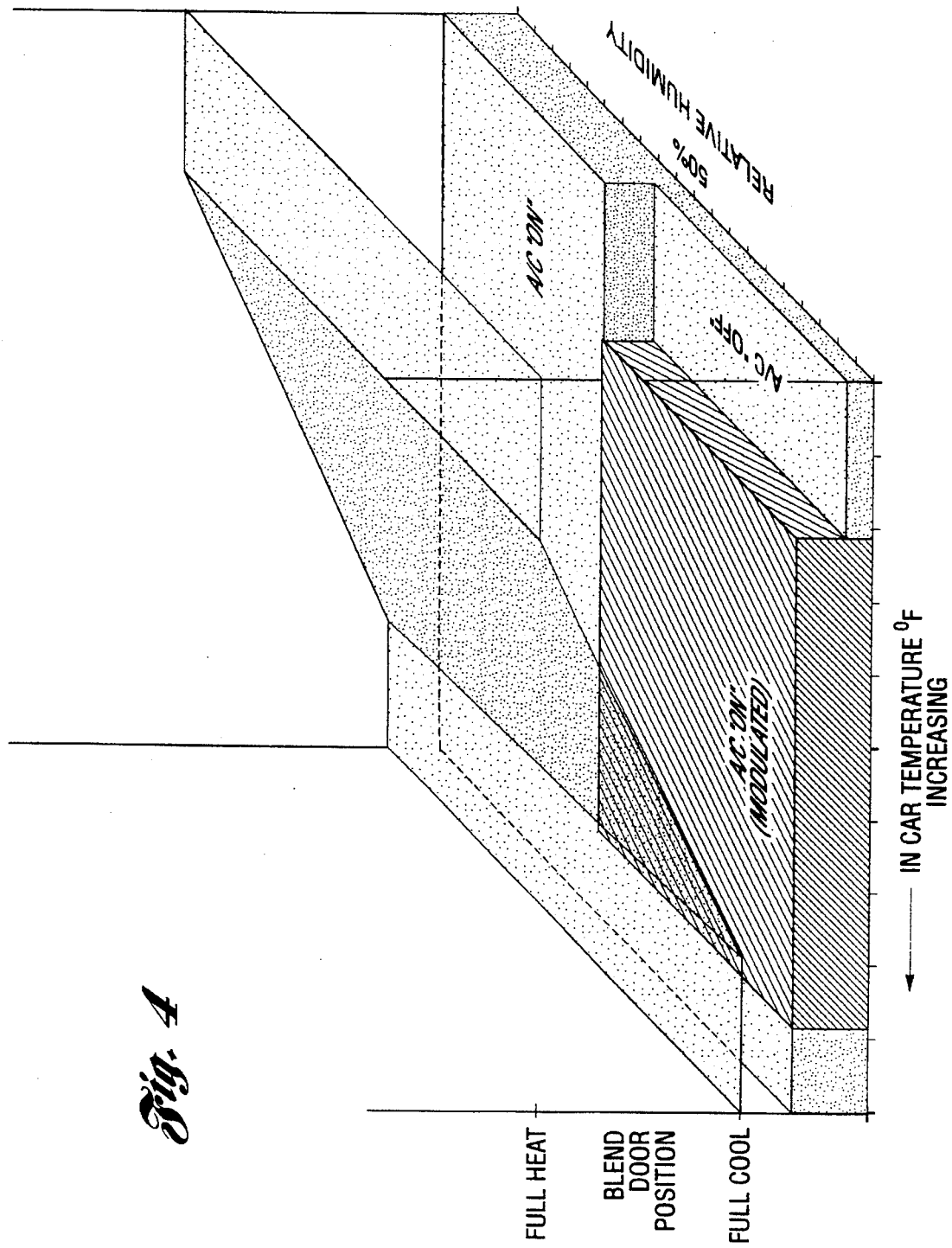
FIG. 4 is a 3-D graph illustrating fuzzy mapping of clutch On Time using the inputs of in-car temperature and humidity.

Given cabin temperature and humidity, the enthalpy of cabin air may be calculated from a look-up table. With enthalpy and the air exchange rate (estimated from blower speed and discharge mode), the heat load on the evaporator 36 may be estimated. This information would be valuable for setting the rate of clutch cycling (i.e. A/C "ON" time) in the CCOT system or refrigerant metering in a TXV (Thermal expansion Valve) system. FIG. 4 is a 3-D graph illustrating fuzzy mapping of clutch On Time using the inputs of incar temperature and humidity.

System outputs such as A/C clutch cycling and recirculation position have impact on economy. As long as recirculation mode is in effect, the product of the cabin air enthalpy and the volume of air passed across the evaporator represents the heat load to the evaporator. The volume of air passing over the evaporator can be determined from blower voltage and the particular discharge air mode in effect. The output is linear with respect to voltage. For example, at 12.8 volts fresh air (i.e. panel air from 1 register) flow may be 49.8 cfm while, at 6.4 volts, the fresh air flow may be 24.9 cfm. Also, panel (i.e. fresh air) mode offers a lower back pressure than floor mode and results in a greater air flow at a given blower voltage.

Figure 3:
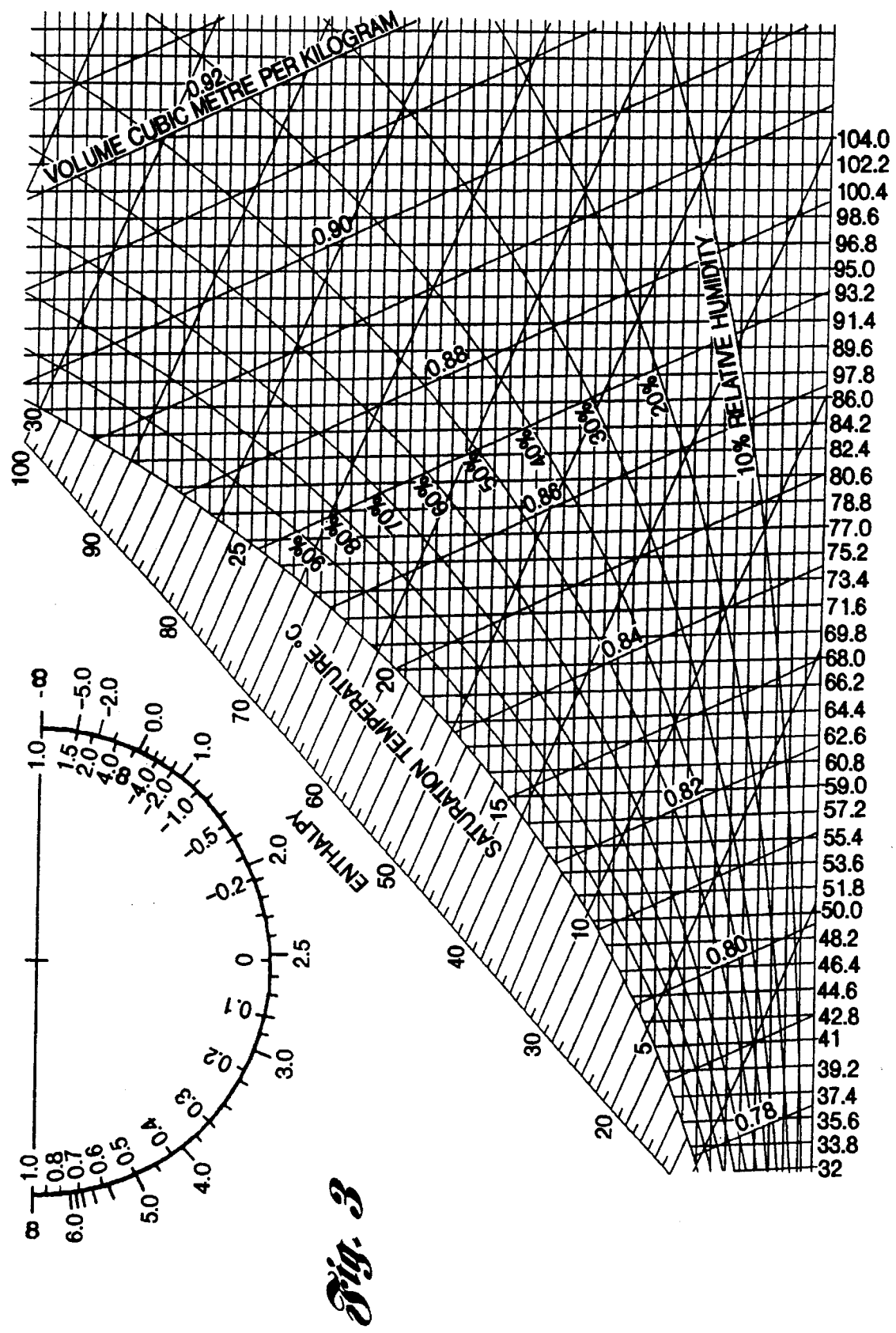
FIG. 3 is a standard graph illustrating the determination of enthalpy from cabin temperature and humidity.

Air enthalpy is a function of air temperature and relative humidity as illustrated in FIG. 3. In recirculation mode, stored tables in the microprocessor can be used to look up the enthalpy from humidity and temperature.

If fresh air intake mode is in effect, one can infer the enthalpy of the outside air to calculate evaporator heat load. The inference can be done in many ways. For example, pressure switch cycling time at a known ambient and/or blend door position at the known ambient. Although the ambient air temperature is known, the ambient air relative humidity is unknown. To infer heat load on the evaporator, natural clutch cycling at a known ambient temperature, blower speed and vehicle velocity could be used. Once an estimate of heat load is made, expected cycling could be superseded by reduced cycling for energy reduction.

The strategy for economy is a complete, standard fuzzy strategy, with the addition of the following rules:
IF Enthalpy is HIGH, THEN Clutch On Time is High
IF Enthalpy is LOW, THEN Clutch On Time is Medium-Low
IF Blend is NOT EXTREME (i.e. max, cool), THEN Clutch On Time is LOW
IF Blend is EXTREME and humidity is LOW, THEN Clutch On Time is OFF
where Enthalpy is either calculated from measured cabin temperature and relative humidity, or determined from a look-up table based on drawing FIG. 3, which illustrates how enthalpy is determined from cabin temperature and cabin temperature. Clutch On Time is the A/C clutch On Time, and Blend is the blend door position for maximum cooling.

The use of the present invention in climate control systems strategy results in improved system economy. The ability to tailor gradual, nonlinear response has allowed the design of the strategy to address certain situations that have not been handled economically in the past.

New vehicle programs and the requirements of simultaneous engineering are reducing the time available to develop new automatic climate control strategies. Consequently, the control strategy should be developed at the same time that the HVAC system is being designed. The organization and flexibility of the present invention allow one to develop a set of base rules even before the characteristics of a HVAC system have been finalized.

While the best mode for carrying out the invention has been described in detail, those familiar with the art to which this invention relates will recognize various alternative designs and embodiments for practicing the invention as defined by the following claims.

What is claimed is:

1. A method for economically controlling a heating, ventilation and air conditioning (HVAC) system of a vehicle which discharges a flow of air to a passenger cabin of the vehicle, the system including a variable speed blower, ducting, cooling means for cooling air in the ducting, a control element having control positions for varying refrigerating capacity of the cooling means, actuators having various control position for controlling the direction of air flow and the ratio of fresh air to recirculated air, a humidity sensor for sensing relative humidity within the cabin and providing a corresponding relative humidity signal, and temperature sensors for sensing temperature within the cabin and providing a corresponding temperature signal, and for sensing ambient temperature and a target set point temperature, the method comprising the steps of:

processing the temperature and relative humidity signals to obtain processed temperature and relative humidity signals;

estimating a single enthalpy of air within the cabin based on the processed temperature and relative humidity signals;

defining membership functions and fuzzy rules between the single enthalpy of air within the cabin and the control positions of the control element; and generating a control signal to control the positions of the control element to cause the system to economically discharge air into the cabin having a desired temperature and flow based on the single enthalpy of air within the cabin, the membership functions and the fuzzy rules.

2. The method as claimed in claim 1 further comprising the step of defining membership functions and fuzzy rules between a control position of one of the actuators and the control positions of the control element and wherein the step of generating is also based on the control position of the one of the actuators.

3. The method of claim 2 wherein the one of the actuators is a blend door.

4. The method of claim 1 wherein the control element is an A/C clutch and wherein the control signal is representative of clutch cycling rate.

5. The method of claim 1 wherein the control element is a valve for metering refrigerant.

6. A control system for economically controlling a heating, ventilation and air conditioning (HVAC) system of a vehicle which discharges a flow of air to a passenger cabin of the vehicle, the HVAC system including a variable speed blower, ducting, cooling means for cooling air in the ducting, a control element having control positions for varying refrigerating capacity of the cooling means, actuators having various control positions for controlling the direction of air flow and the ratio of fresh air to recirculated air, a humidity sensor for sensing relative humidity within the cabin and providing a corresponding, relative humidity signal, and temperature sensors for sensing temperature within the cabin and providing a corresponding temperature signal and for sensing, ambient temperature and a target set point temperature, the system comprising:

means for processing the temperature and relative humidity signals to obtain processed temperature and relative humidity signals;

means for estimating a single enthalpy of air within the cabin based on the processed temperature and relative humidity signals;

means for defining membership functions and fuzzy rules between the single enthalpy of air within the cabin and the control positions of the control element; and means for generating a control signal to control the position of the control element to cause the HVAC system to economically discharge air into the cabin having a desired temperature and flow based on the single enthalpy of air within the cabin, the membership functions and the fuzzy rules.

7. The system as claimed in claim 6 further comprising means for defining membership functions and fuzzy rules between a control position of one of the actuators and the control positions of the control element and wherein the means for generating generates the control signal also based on the control position of the one of the actuators.

8. The system as claimed in claim 7 wherein the one of the actuators is a blend door.

9. The system as claimed in claim 6 wherein the control element is a clutch and wherein the control signal is representative of clutch cycling rate.

10. The system as claimed in claim 6 wherein the control element is a valve for metering refrigerant.

* * * * *